(12) United States Patent
Hendriks

(10) Patent No.: US 7,239,459 B2
(45) Date of Patent: Jul. 3, 2007

(54) SCANNING DEVICE INCLUDING PLASTIC HIGH-NUMERICAL APERTURE OBJECTIVE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 252 days.

(21) Appl. No.: 10/475,380

(22) PCT Filed: Mar. 25, 2002

(86) PCT No.: PCT/IB02/01371

§ 371 (c)(1),
(2), (4) Date: Oct. 21, 2003

(87) PCT Pub. No.: WO02/086874

PCT Pub. Date: Oct. 31, 2002

(65) Prior Publication Data

US 2004/0120053 A1   Jun. 24, 2004

(30) Foreign Application Priority Data

Apr. 25, 2001 (EP) .................................. 01201505
Oct. 15, 2001 (EP) .................................. 01203888

(51) Int. Cl.
*G02B 9/04* (2006.01)
*G02B 13/18* (2006.01)
*G11B 7/00* (2006.01)

(52) U.S. Cl. ...................... 359/793; 359/717; 359/719; 369/112.24

(58) Field of Classification Search ........ 359/717–719, 359/793, 796, 798; 369/112.24
See application file for complete search history.

(56) References Cited

U.S. PATENT DOCUMENTS 5,880,893 A     3/1999   Suganuma ................... 359/717
6,317,276 B1 *  11/2001  Braat ......................... 359/785

(Continued)

FOREIGN PATENT DOCUMENTS

EP     0800170 A2    10/1997

(Continued)

OTHER PUBLICATIONS

BHW Hendriks et al; "Single Digital Video Recording/Digital Versatile Disk objective and plastic Digital Video Recording objective"; Jpn. J. Appl Phys.; vol. 41 (2002); pp. 1791-1797.*

(Continued)

*Primary Examiner*—Scott J. Sugarman

(57) ABSTRACT

An optical scanning device for scanning an information layer (104) of an optical record carrier (102) includes a radiation source (110) for generating a radiation beam (108) and a high-NA objective system (118) for converging the radiation beam on the information layer. The objective system includes a first lens (116) and a second lens (117). The first lens and the second lens are made of plastic. The signs of the temperature-dependence of the spherical aberration of the first and second lens are different and the magnitudes of the temperature-dependence of the spherical aberration of the two lenses is substantially equal such that the temperature-dependence of the spherical aberration of the objective system as a whole is reduced to less than 30 m$\lambda$ OPDrms for a temperature change of 30 K.

12 Claims, 8 Drawing Sheets

U.S. PATENT DOCUMENTS

| | | | |
|---|---|---|---|
| 6,487,026 B2 | 11/2002 | Baartman et al. | 359/808 |
| 6,510,011 B2 | 1/2003 | Hendriks et al. | 359/823 |
| 7,050,246 B2 * | 5/2006 | Hendriks | 359/793 |
| 2001/0038499 A1 | 11/2001 | Baurtman | |

FOREIGN PATENT DOCUMENTS

| | | |
|---|---|---|
| EP | 102251 A2 | 5/2001 |
| EP | 1199717 A2 | 4/2002 |
| JP | 59202414 | 11/1981 |
| JP | 59083114 | 5/1984 |
| JP | 9138344 | 5/1997 |
| JP | 9185836 | 7/1997 |
| WO | WO 01/48745 A2 | 7/2001 |

OTHER PUBLICATIONS

Search report from U.S. App. No. 10/475,364—PCT/IB02/01372.

* cited by examiner

SCANNING DEVICE INCLUDING PLASTIC HIGH-NUMERICAL APERTURE OBJECTIVE

The invention relates to an optical scanning device for scanning an information layer of an optical record carrier, the device including a radiation source for generating a radiation beam having a wavelength λ and an objective system having a numerical aperture (NA) larger than 0.65 for converging the radiation beam on the information layer, the objective system including a first and a second lens both made of plastic. The invention relates also to an objective system for use in such a scanning device and to a method for manufacturing the objective system.

A high-density optical information storage systems, such as the Digital Video Recorder (DVR), operates at a relatively high NA, e.g. 0.85, and a relatively short wavelength, e.g. 405 nm. If an objective system for such a system contains a single lens, the lens will have very tight tolerances, making its manufacture relatively expensive. If the objective system contains two lenses, the tolerance ranges are more relaxed, which facilitates its mass production. Thus far, these objectives are generally made of glass using the glass-moulding process or the so-called glass-2P process, in order to stay within the still tight tolerance ranges. The use of glass keeps the manufacturing costs at a relatively high level. In order to reduce these costs, the lenses of the objective system are preferably made of a plastic material.

The U.S. Pat. No. 5,880,893 discloses a high-NA dual-lens objective system, of which both lenses are made of polymethyl methacrylate. A disadvantage of this objective system is, that its performance is too sensitive for temperature changes.

It is an object of the invention to provide a scanning device including a dual-lens objective system made of plastic, which has an improved temperature stability.

The object of the invention is met, if, according to the invention, the scanning device as set out in the preamble, is provided with an objective system in which the first and second lens each have a temperature-dependence of the spherical aberration on the radiation beam, the signs of the dependence of the first and second lens being different and the magnitudes of the dependence of the first and second lens being substantially equal such that the temperature-dependence of the spherical aberration of the objective system as a whole is reduced to less than 30 mλ OPDrms for a temperature change of 30 K.

An analysis of the prior art objective system disclosed in said U.S. Pat. No. 5,880,893 reveals that a temperature change of 30 K causes a 47 mλ OPDrms wavefront deviation. An accepted tolerance for the temperature-dependence of the wavefront deviation for systems of the DVR type is 30 mλ OPDrms for a temperature change of the objective system of 30 K. Since the quality of the optical system of the scanning device is inversely proportional to the square of the rms-wavefront deviation, the prior art objective system will be unsuitable for many high-density optical recording applications. The design of the objective system appears to have focussed on the decentre tolerance of the two lenses in the objective system.

The invention resides partly in the recognition that a deviation of the temperature of a lens from the design temperature introduces spherical aberration as a main aberration or changes an already existing spherical aberration of the lens. To control the spherical aberration, the further insight is used, that the temperature-dependence of the spherical aberration of a lens (i.e. the derivative of the spherical aberration with respect to the temperature) can be made positive or negative. The objective system is designed such that the signs of the temperature-dependences of the spherical aberration of the first and second lens are different. In other words, when the temperature of the objective system changes, an increase of the spherical aberration of one of the lenses of the objective system is accompanied by a decrease of the spherical aberration of the other lens. By appropriate design the magnitude of the temperature dependence of the spherical aberration of each of the two lenses should be made equal to such an extent that the counteracting changes of the spherical aberration of the two lenses reduce the temperature-dependence of the spherical aberration of the objective system as a whole to a value of less than 30 mλ OPDrms for a temperature change of 30 K.

A judicious design of the two lenses should not only increase the decentre tolerance of the two lenses, as in the prior art objective system, but should also give appropriately determine the sign and magnitude of the temperature-dependence of the spherical aberration of each of the lenses. The resulting temperature stability of the objective lens makes it suitable for use in many demanding applications. A further advantage of the invention is that the temperature compensation does not require additional optical elements in the scanning device but can be incorporated in the two lenses of the objective system, which two lenses are already present because of manufacturing reasons. Moreover, a compensation within the objective system is preferred over a compensation by another optical element such as a collimator lens. Since the temperature of the objective system is determined in part by the heating of the actuator close to the objective system, the temperature of the collimator and the objective system need not be equal, resulting in an incorrect temperature compensation of the objective system by the collimator. This problem does not arise when the lenses of the objective system themselves are mutually compensated for temperature changes.

The insight that the sign and magnitude of the temperature-dependence of the spherical aberration introduced by a lens is a function of the magnification of the lens can be used to adapt the magnification of the lens so as to give the temperature-dependence of its spherical aberration the desired sign. In a preferred embodiment the magnification of the first lens is smaller than 0.2 and the magnification of the second lens is larger than 0.2.

In a preferred embodiment, the second lens has a magnification β in the range from 0.3 to 0.6. The upper limit for β is determined by the decentre tolerance of the two lenses, giving a maximum of 30 mλ OPDrms wavefront deviation, and the lower limit is determined by the temperature tolerance, limiting the spherical aberration due to a temperature change of 30 K to 30 mλ OPDrms wavefront deviation.

In a preferred embodiment of the objective system the second lens is integrated with the mount for the first lens, so that the second lens and the mount can be made in one injection moulding process. The integration of the relatively small second lens and the mount eases the handling of the second lens. If the mount has a cylinder shape, then the mounting of the first lens in this cylindrical mount can be done in the same way as explained in patent application WO EP01/02156 (PHNL00132). This method is possible when the body of the first lens has a thickness which is larger than the radius of this body (see also paten application WO EP01/02348 (PHNL000269)). As a result, a significant cost reduction is achieved, since the second lens can be manufactured easier with the injection moulding technique and there are now only two components which have to be assembled instead of three in the case when the two lenses and the mount are separate components.

A further aspect of the invention relates to an objective system having a numerical aperture larger than 0.65 for focussing a radiation beam having a wavelength $\lambda$ and including a first and a second lens both made of plastic, wherein, according to the invention, the first and second lens each have a temperature-dependence of the spherical aberration imposed on the radiation beam, the signs of the dependence of the first and second lens being different and the magnitudes of the dependence of the first and second lens being substantially equal such that the temperature-dependence of the spherical aberration of the objective system as a whole is reduced to less than 30 m$\lambda$ OPDrms for a temperature change of 30 K.

A still further aspect of the invention relates to a method for manufacturing an objective system having a numerical aperture larger than 0.65 for focussing a radiation beam having a wavelength $\lambda$ and including a first and a second lens both made of plastic, including a firs step of designing the objective system to have a temperature-dependence of the spherical aberration of less than 30 m$\lambda$ OPDrms for a temperature change of 30 K by making the signs of the temperature-dependence of the spherical aberration of the first and second lens different and the magnitudes of the temperature-dependence of the spherical aberration of the first and second lens substantially equal, a second step of manufacturing the first and second lens according to the design, and a third step of assembling the first and second lens to an objective system.

The invention will now be described in greater detail by way of example with reference to the accompanying drawings in which.

Figure 6:
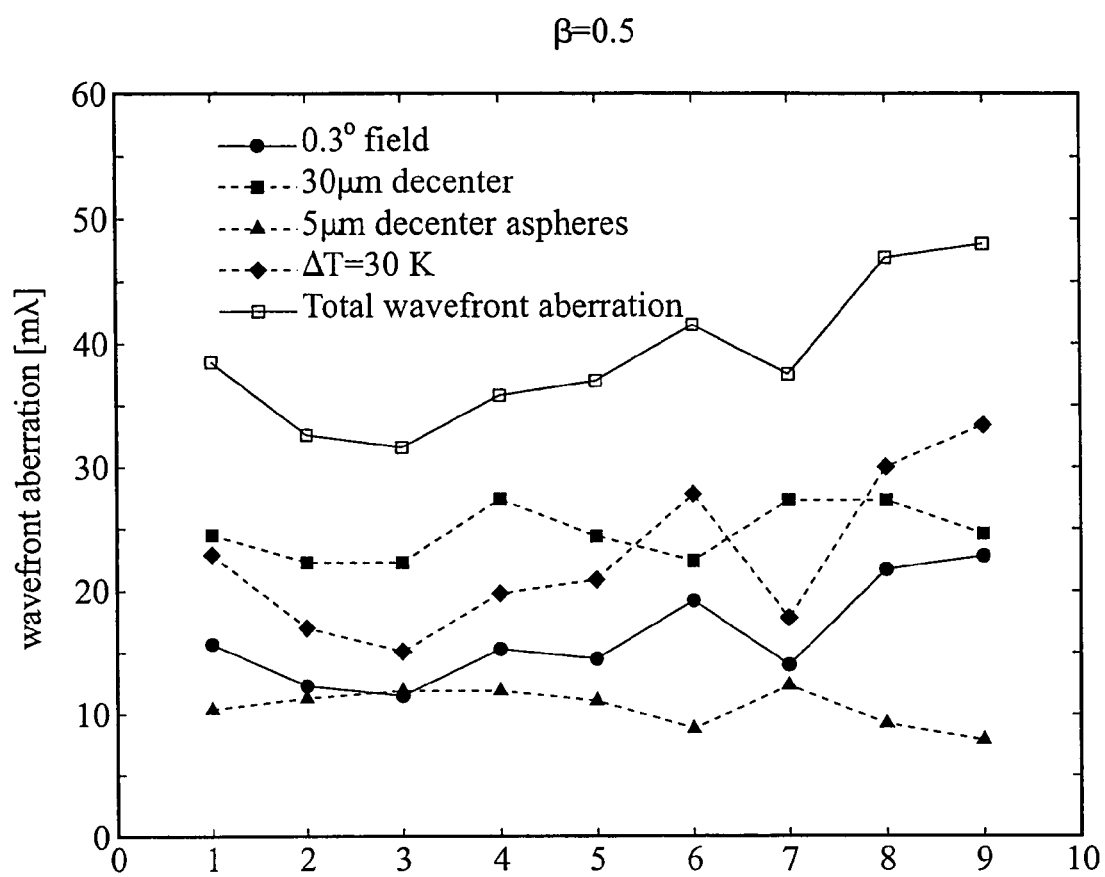
Figure 7:
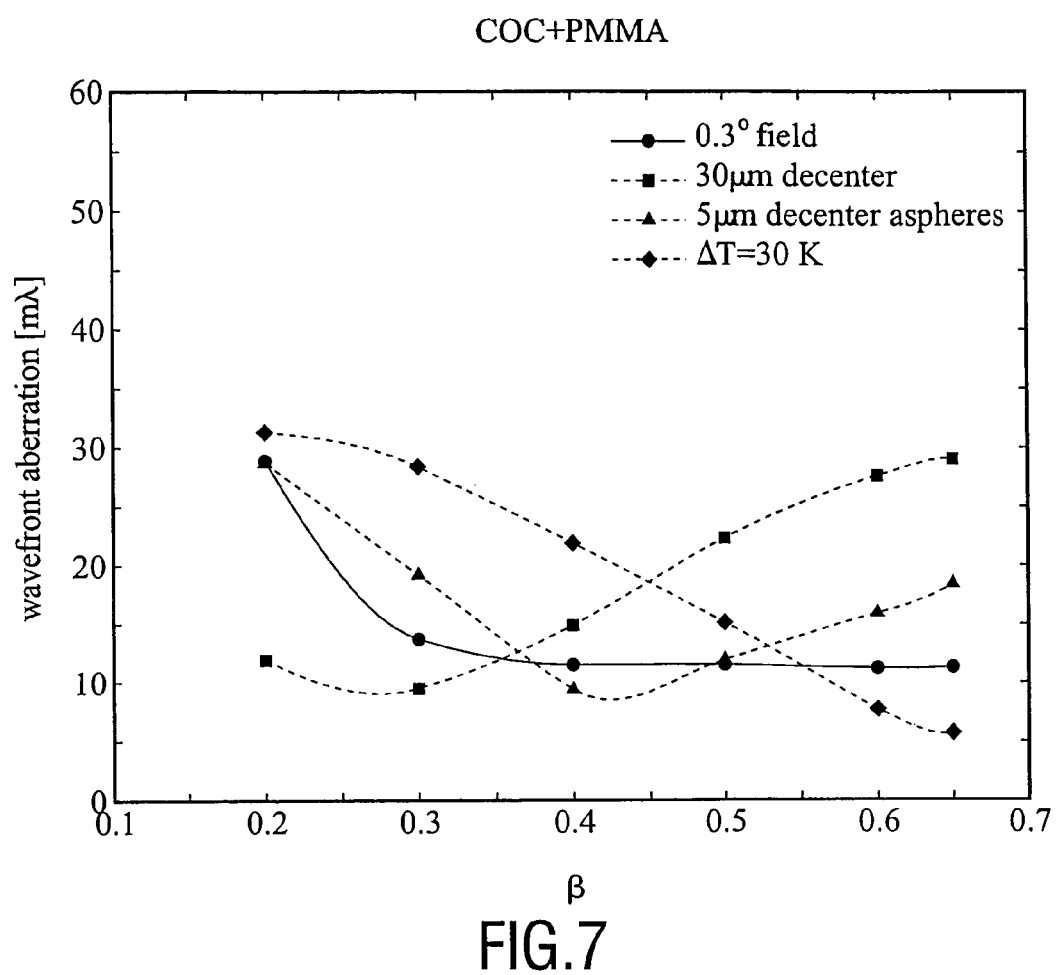
Figure 8:
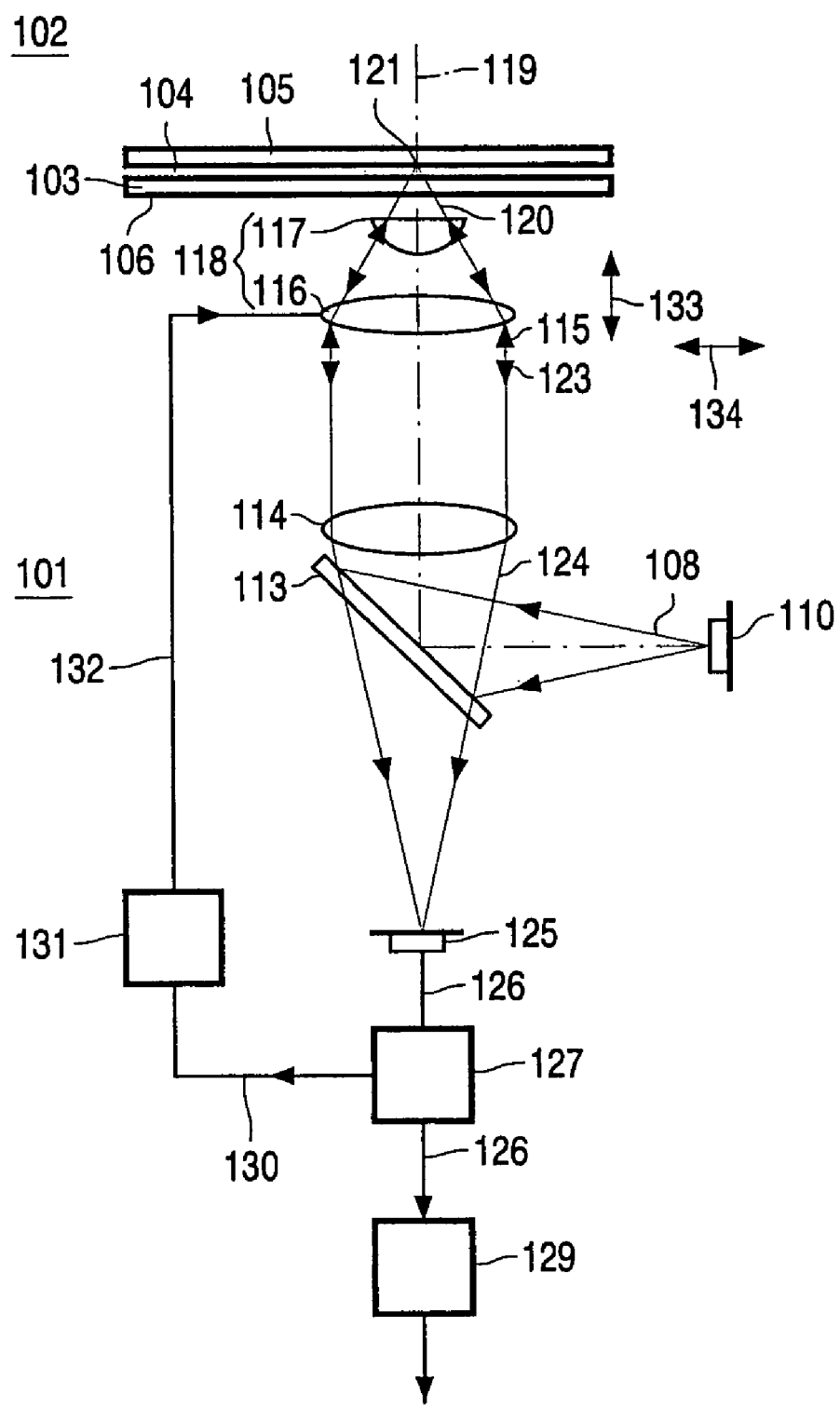

FIG. 6 shows the wavefront aberration of objective system when made of PMMA, COC or PC, where the two lenses may be of different materials; the number on the horizontal axis corresponds to: 1 with first lens PC and second lens COC, 2 with first lens PC and second lens PMMA, 3 with first lens COC and second lens PMMA, 4 with first lens PC and second lens PC, 5 with first lens COC and second lens COC, 6 with first lens PMMA and second lens PMMA, 7 with first lens COC and second lens PC, 8 with first lens PMMA and second lens PC, 9 with first lens PMMA and second lens COC;

FIG. 7 shows the wavefront aberration of the objective system when the first lens of the objective system is made of COC and the second lens of PMMA as a function of the magnification $\beta$ of the second lens; and FIG. 8 shows a device for scanning an optical record carrier including an objective system.

Figure 1:
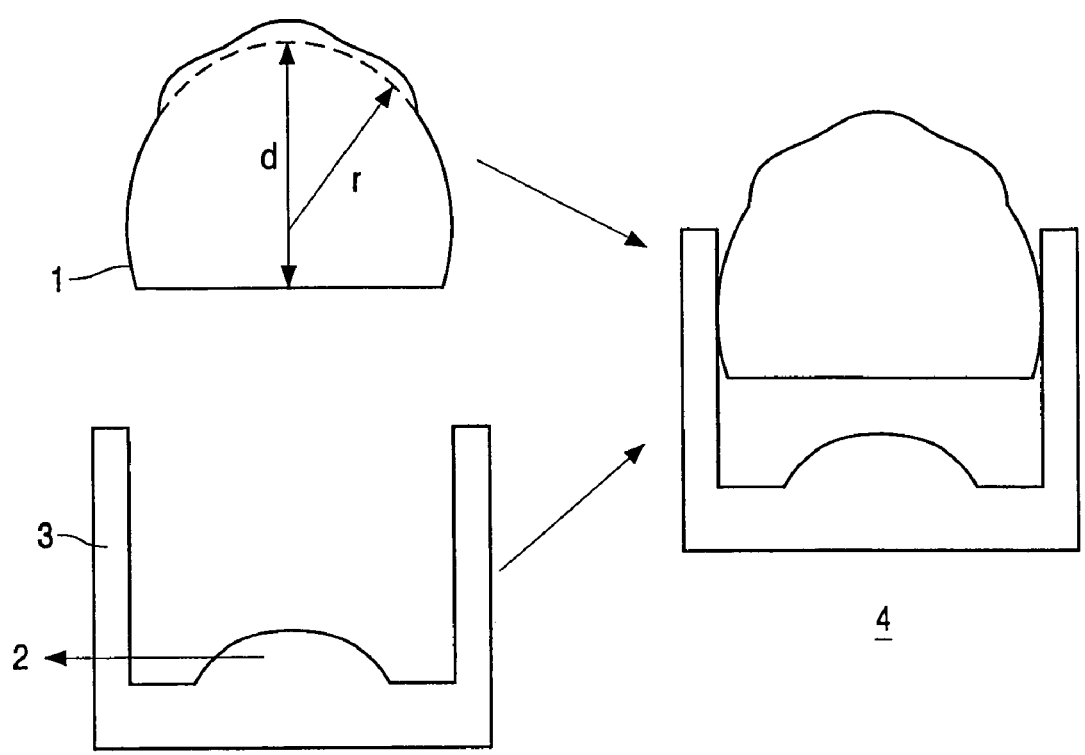
FIG. 1 shows an objective system consisting of two elements.

FIG. 1 shows an embodiment of the objective system according to the invention, which allows tilt alignment and easy lens assembly without affecting the decentring of the lenses. The objective system comprises a first lens 1 made of plastic, which includes a substantially spherical lens body enclosing more than a half of this substantially spherical lens body and a second lens 2 made of plastic and a cylindrically shaped plastic mount 3. The optically effective diameter of the first lens is larger than that of the second lens. The second lens 2 and the cylindrical mount 3 are made of the same plastic and form a single constructive unit. The thickness d and the radius r of the spherical glass body of the first lens 1 complies with d>r. Element 4 is the objective system in the form of the assembled first lens, the mount and the second lens. In the Figure the radiation beam enters the objective system from the top, and the exiting beam focuses at a position below the objective system. The information layer of an optical record carrier may be arranged at this position for scanning this layer by the spot formed by the exiting beam.

The embodiment of the objective system of FIG. 1 has an entrance pupil diameter of 3.0 mm, a record-carrier-side numerical aperture NA=0.85, a design wavelength of 405 nm, a free working distance (FWD) between the second lens and the disc of 0.15 mm, and a transparent layer of the record carrier made of PC with thickness 0.1 mm.

Figure 2:
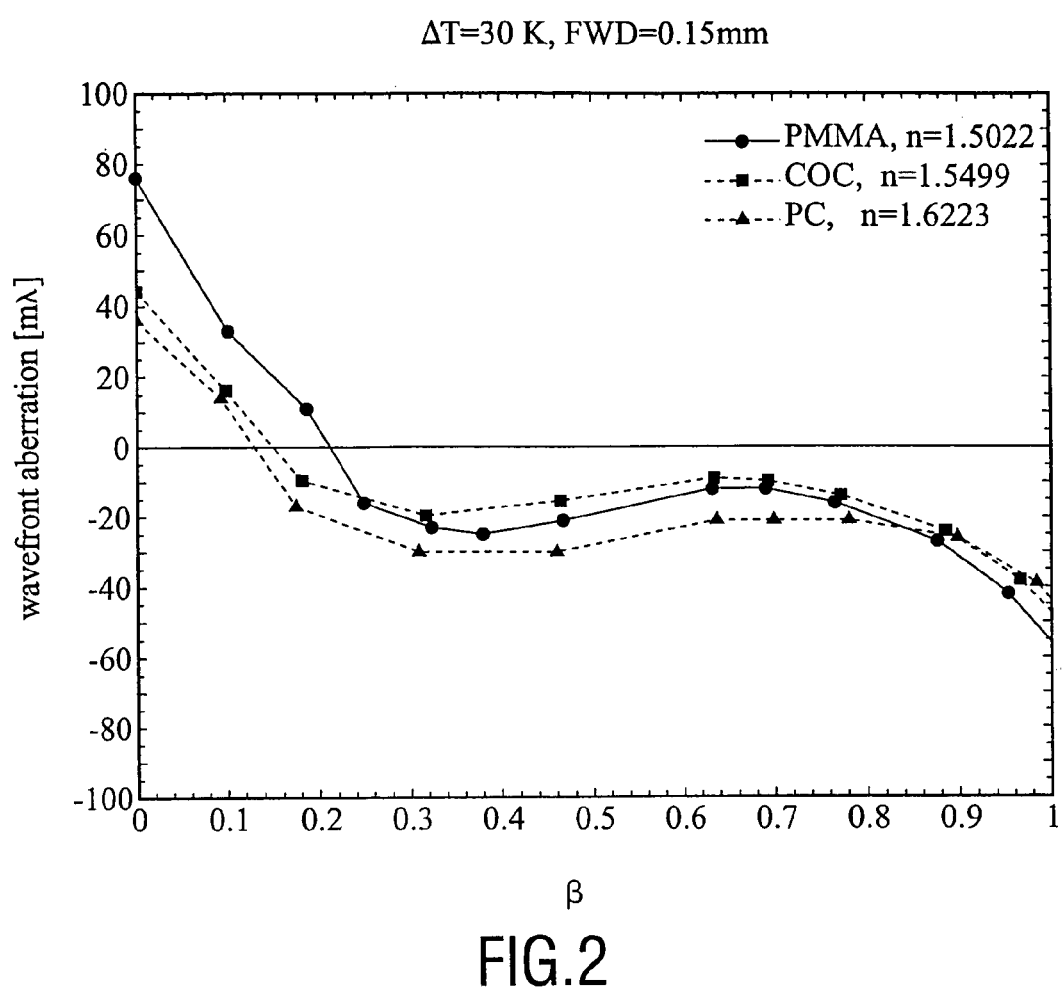
FIG. 2 shows the wavefront aberration OPDrms of the objective system arising due to a temperature rise of 30 K as a function of the magnification $\beta$ of the second lens.

FIG. 2 shows the behaviour of the optical properties of the second lens when its temperature is changed. The Figure shows the change of the wavefront aberration of the entire objective system when the temperature of the second lens only is increased by 30 K. The aberration is plotted as a function of the magnification $\beta$ of the second lens. When changing the magnification of the second lens, the imaging properties of the objective system as a whole are maintained by a corresponding change in the properties of the first lens and the distance between the first and second lens. The wavefront aberration is presented as the well-known root-mean-square value of the optical path difference (OPDrms). A negative value of the OPDrms in the Figure means that the Zernike coefficient for spherical aberration, $A_{40}$, is negative. The three lines in the Figure show the behaviour of the aberration for the case that the second lens is made of polymethyl methacrylate (PMMA), cyclic olefin copolymer (COC) and polycarbonate (PC). The thermal properties of PMMA, COC and PC are given in Table I. The change in spherical wavefront aberration is positive and large for a lens having an infinite conjugate ($\beta=0$). For a magnification $\beta$ greater than approximately 0.2 the change in the wavefront aberration is negative. Note that the value of $\beta$ at which the zero crossing occurs reduces when the refractive index of the plastic material increases.

TABLE I

Thermal properties of PMMA, COC and PC.

|  | PMMA | COC | PC |
|---|---|---|---|
| n @ 405 nm | 1.5022 | 1.5499 | 1.6223 |
| dn/dT [$10^{-5}$/K] | −12.5 | −10.0 | −10.8 |
| Coeff. Lin. Expansion [$10^{-5}$/K] | 70 | 70 | 70 |

The above recognition can be used to reduce the temperature dependence of a plastic high-NA objective system. Consider a two component plastic DVR objective system operating at infinite conjugate; a first lens faces the radiation source of the scanning system and a second lens faces the record carrier. When the magnifications of the two lenses are chosen such as to give the temperature-dependence of the spherical aberration of the first and second lens different signs, the temperature-dependence of the spherical aberration of one lens can at least be partly compensated by that of the other lens. In this way a substantial reduction of the temperature dependence of spherical aberration of the plastic high-NA objective system can be achieved. In the example of FIG. 1, the magnification of the second lens 2 is larger than 0.2.

The invention allows the temperature tolerance of a plastic high-NA objective to be made sufficiently wide for optical recording purposes, which will also become apparent from the following more detailed examples.

An embodiment of the objective system is designed for focussing a collimated radiation beam having a wavelength of 405 nm to a focus on an information layer of an optical record carrier through a transparent layer of PC (n=1.6223) with thickness 0.1 mm and arranged on the information layer. The entrance pupil diameter is 3.0 mm, the numerical aperture of the objective system at the object-side is NA=0.85. The free working distance is FWD=0.15 mm. The objective system includes a bi-aspheric first lens followed by a plano-aspheric second lens. The design of objective system is optimised using a merit function based on requirements regarding field tolerance, decentre tolerance of the two lenses, decentre tolerance of the aspheric surfaces of the bi-aspheric lens and the temperature tolerance. The thickness of the first lens in the following embodiments was fixed at 2.5 mm and that of the second lens at 0.85 mm.

The embodiment of the objective system having a first and second lens of COC and a magnification β of the second lens of 0.5 has the following design parameters. The first lens has a convex surface facing the radiation source and having a rotationally symmetrical aspherical shape given by the equation:

$$z(r) = \sum_{i=1}^{8} b_{2i} r^{2i}$$

in which z is the position of the surface in the direction of the optical axis and measured in millimetres, r is the distance to the optical axis in millimetres, and $b_{2i}$ is the coefficient of the $2i^{th}$ power of r. The values of the coefficients $b_2$ to $b_{16}$ are 0.27152628, 0.0094409894, 0.0044607999, −0.0079739895, 0.0078782292, −0.0043791397, 0.0012874114 and −0.00015939048, respectively. The convex surface on the other side of the first lens is also aspherical, having values of the coefficients $b_2$ to $b_{16}$ equal to 0.027369439, 0.022047913, −0.045429955, 0.061344633, −0.071559255, 0.085540565, −0.076476945 and 0.026949936, respectively. The magnification of the first lens is zero, because one of its object conjugate lies at infinity. The second lens of the objective system has a distance of 0.310 mm to the first lens. The convex surface of the second lens directed towards the first lens has an aspherical shape, the coefficients $b_2$ to $b_{16}$ being equal to 0.59812098, 0.25015439, −0.72194864, 7.6081286, −37.847569, 105.36375, −153.4902 and 90.242243 respectively. The boundary face on the other side of the second lens has an infinite radius of curvature.

Figure 3:
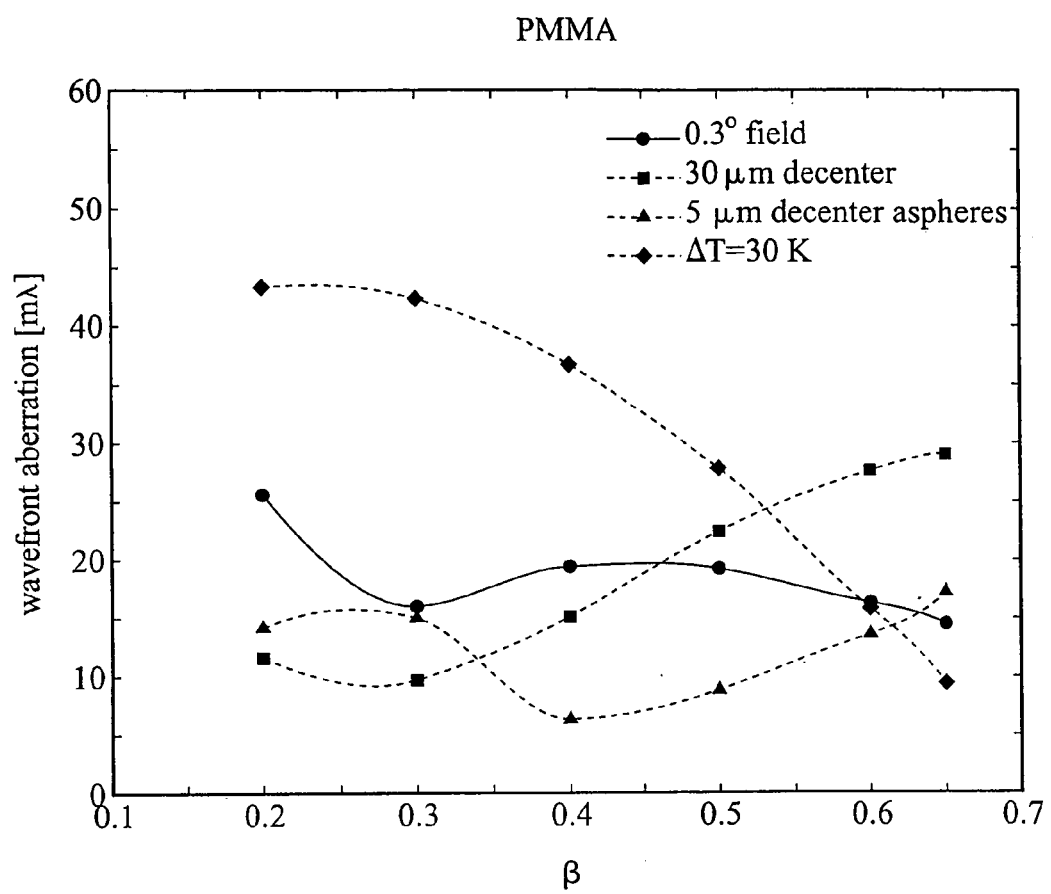
FIGS. 3, 4 and 5 show the wavefront aberration of the objective system when the first and second lens are made of PMMA, COC and PC, respectively, as a function of the magnification $\beta$ of the second lens.
Figure 4:
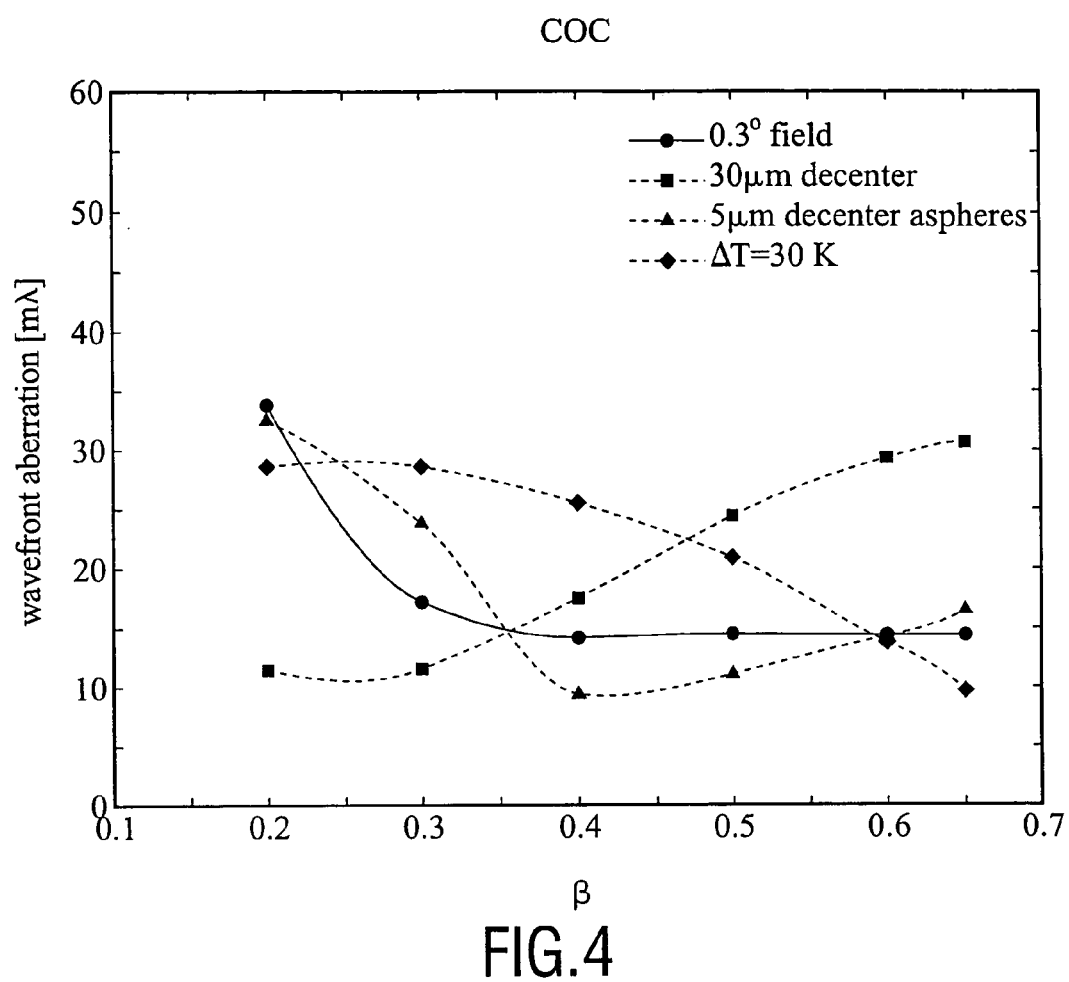
Figure 5:
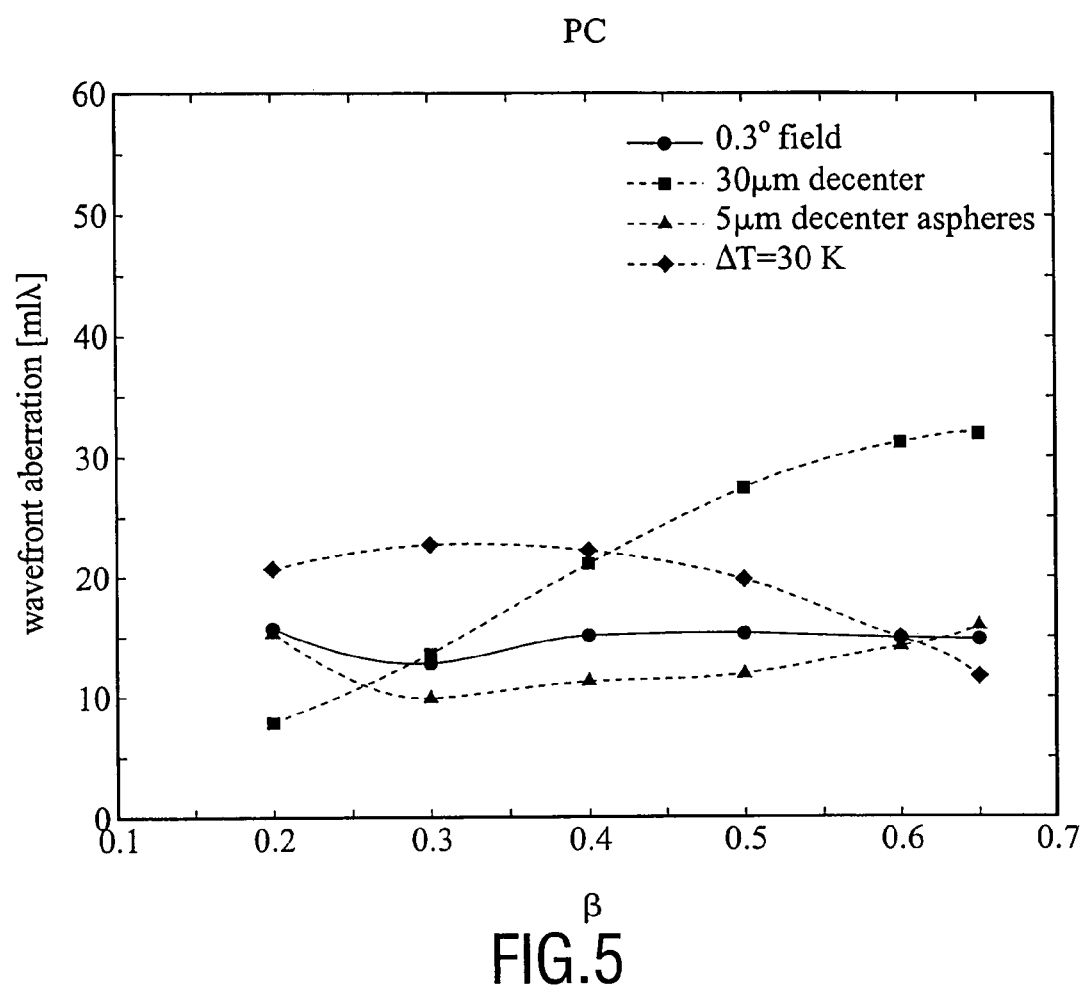

In the analysis of the temperature dependence the mount for the two lenses was taken to be made of the same material as the second lens. FIGS. 3, 4 and 5 show the change in wavefront aberration of the objective system when it is made of PMMA, COC and PC, respectively, as a function of the magnification β of the second lens. In all three cases the tolerance for the temperature increases when β increases. On the other hand, the tolerance for decentre of the two lenses decreases when β increases. Taking 30 mλ OPDrms as the upper limit for the aberrations, the magnification β of the second lens is preferably smaller than 0.6 due to the decentre tolerance. The lower boundary of the magnification is determined by the temperature-dependence of the spherical aberration, which is the dominant aberration for smaller β and which increases with decreasing magnification in the β-range of interest. Hence, taking 30 mλ OPDrms as upper limit for the temperature-dependence of the spherical aberration, in the case of PMMA the temperature tolerance limits the magnification to β>0.45, while for COC this tolerance implies that β>0.3. For PC no further limitations arise. Finally, for ease of manufacturing, the magnification β of the second lens should not be too small, because for small β most of the optical power of the system will be present in the first lens, while the second lens has only a small optical power. As a result, the magnification β is preferably larger than 0.3.

When both lenses of the objective system are made of a single plastic material, the system tolerances improve when the refractive index of the material is higher.

FIG. 6 shows the wavefront aberrations for objective systems in which the two lenses are made of PMMA, COC or PC. The two lenses may be of the same material or of different materials. The Figure shows that the best combination is where the first lens is made of COC followed by a second lens made of PMMA. The case where the first lens is made of PC followed by a second lens made of PMMA is slightly worse. In general, the objective system performs better for combinations in which the first lens has a higher refractive index than the second lens.

FIG. 7 shows the change in wavefront aberration of the objective system in which the first lens is made of COC and the second lens of PMMA as a function of the magnification β of the second lens. The Figure shows that optimum performance is obtained when the magnification β satisfies the condition: 0.4<β<0.5.

Although the above embodiments show the lens in the objective system having the smaller magnification to be closer to the radiation source than the lens having the larger magnification, the lens having the larger magnification may also be arranged closer to the radiation source than the lens having the smaller magnification.

The objective system can be used in a scanning device of an optical recording system, for instance in the so-called DVR optical system.

FIG. 8 shows a device 101 for scanning an optical record carrier 102 of the DVR type. The record carrier comprises a transparent layer 103, on one side of which an information layer 104 is arranged. The side of the information layer facing away from the transparent layer is protected from environmental influences by a protection layer 105. The side of the transparent layer facing the device is called the entrance face 106. The transparent layer 103 acts as a substrate for the record carrier by providing mechanical support for the information layer. Alternatively, the transparent layer may have the sole function of protecting the information layer, while the mechanical support is provided by a layer on the other side of the information layer, for instance by the protection layer 105 or by a further information layer and a transparent layer connected to the information layer 104. Information may be stored in the information layer 104 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 101 comprises a radiation source 110 that can emit a radiation beam 108. The radiation source shown in the Figure comprises a semiconductor laser 110. A beam splitter 113 reflects the diverging radiation beam 108 on the optical path towards a collimator lens 114, which converts the diverging beam 108 into a collimated beam 115. The collimated beam 115 is incident on a first lens 116 and subsequently on a second lens 117 of an objective system 118. The objective system may comprise two or more lenses and/or a grating. The objective system 118 has an optical axis 119. The objective system 118 changes the beam 115 to a converging beam 120, incident on the entrance face 106 of the record carrier 102. The objective system has a spherical aberration correction adapted for passage of the radiation beam through the thickness of the transparent layer 103. The converging beam 120 forms a spot 121 on the information layer 104. Radiation reflected by the information layer 104 forms a diverging beam, transformed into a substantially collimated beam 123 by the objective system 118 and subsequently into a converging beam 124 by the collimator lens 114. The beam splitter 113 separates the forward and reflected beams by transmitting at least part of the converging beam 124 towards a detection system 125. The detection system captures the radiation and converts it into electrical output signals 126. A signal processor 127 converts these output signals to various other signals. One of the signals is an information signal 128, the value of which represents information read from the information layer 104. The information signal is processed by an information processing unit for error correction 129. Other signals from the signal processor 127 are the focus error signal and radial error signal 130. The focus error signal represents the axial difference in height between the spot 121 and the information layer 104. The radial error signal represents the distance in the plane of the information layer 104 between the spot 121 and the centre of a track in the information layer to be followed by the spot. The focus error signal and the radial error signal are fed into a servo circuit 131, which converts these signals to servo control signals 132 for controlling a focus actuator and a radial actuator respectively. The actuators are not shown in the Figure. The focus actuator controls the position of the objective system 118 in the focus direction 133, thereby controlling the actual position of the spot 121 such that it coincides substantially with the plane of the information layer 104. The radial actuator controls the position of the objective lens 118 in a radial direction 134, thereby controlling the radial position of the spot 121 such that it coincides substantially with the centre line of a track to be followed in the information layer 104. The tracks in the Figure run in a direction perpendicular to the plane of the Figure.

The invention claimed is:

1. An optical scanning device for scanning an information layer of an optical record carrier, the device including a radiation source for generating a radiation beam having a wavelength $\lambda$ and an objective system having a numerical aperture larger than 0.65 for converging the radiation beam on the information layer, the objective system including a first and a second lens both wade of plastic, characterized in that the first and second lens each have a temperature-dependence of the spherical aberration imposed on the radiation beam, the signs of the dependence of the first and second lens being different and the magnitudes of the dependence of the first and second lens being substantially equal such that the temperature-dependence of the spherical aberration of the objective system is reduced to less than 30 m$\lambda$ OPDrms for a temperature change of 30 K.

2. The optical scanning device according to claim 1, including a detection system for converting radiation coming from the information layer to an information signal, and an information processing unit for error correction of the information signal.

3. An objective system having a numerical aperture larger than 0.65 for focussing a radiation beam having a wavelength $\lambda$ and including a first and a second lens bath made of plastic, characterised in that the first and second lens each have a temperature-dependence of the spherical aberration Imposed on the radiation beam, the signs of the dependence of the first and second lens being different and the magnitudes of the dependence of the first and second lens being substantially equal such that the temperature-dependence of the spherical aberration of the objective system is reduced to less than 30 m$\lambda$ OPDrms for a temperature change of 30K.

4. An objective system having a numerical aperture larger than 0.65 for focusing a radiation beam having a wavelength $\lambda$ and including a first and a second lens both made of plastic, characterized in that the first and second lens each have a temperature-dependence of the spherical aberration imposed on the radiation beam, the signs of the dependence of the first and second lens being different and the magnitudes of the dependence of the first and second lens being substantially equal such tat the temperature-dependence of the spherical aberration of the objective system is reduced to less than 30 m$\lambda$ OPDrms for a temperature change of 30 K, wherein the first lens has a magnification $\beta$ smaller than 0.2 and the second lens has a magnification $\beta$ larger than 0.2.

5. The objective system according to claim 4, wherein the second lens has a magnification $\beta$ in the range from 0.3 to 0.6.

6. The objective system according to claim 4, wherein the first lens is made of a material having a higher refractive index than the material of which the second lens is made.

7. The objective system according to claim 4, wherein the first lens is made of COC and the second lens is made of PMMA, and the magnification of the second lens is in the range from 0.4 to 0.5.

8. A method for manufacturing an objective system having a numerical aperture larger than 0.65 for focussing a radiation beam having a wavelength $\lambda$ and including a first and a second lens both made of plastic, including the steps of designing the objective system to have a temperature-dependence of the spherical aberration of less than 30 m$\mu$ OPDrms for a temperature change of 30 K by making the signs of the temperature-dependence of the spherical aberration of the first and second lens different and the magnitudes of the temperature-dependence of the first and second lens substantially equal, manufacturing the first and second lens according to the design and assembling the first and second lens to an objective system.

9. The method according to claim 8, wherein the first and second lens are manufactured using injection moulding.

10. A method for manufacturing an objective system having a numerical aperture larger than 0.65 for focussing a radiation beam having a wavelength $\lambda$ and including a first and a second lens both made of plastic, the method including designing the objective system to have a temperature-dependence of the spherical aberration of less than 30 m$\lambda$ OPDrms for a temperature change of 30 K by making the signs of the temperature-dependence of the spherical aberration of the first and second lens different and the magnitudes of the temperature-dependence of the first and second lens substantially equal, manufacturing the first and second lens according to the design and assembling the first and second lens to an objective system, wherein the sign of the temperature-dependence of the spherical aberration of the first and second lens is set by giving the first lens a magnification β smaller than 0.2 and the second lens a magnification larger than 0.2.

11. An objective lens system comprising:

a first plastic lens of positive power, adapted to receive a parallel beam, for converging the parallel beam into a vergent beam, which first plastic lens introduces a first significant temperature dependent spherical aberration; and a second plastic lens of non-negitive power adapted to receive the vergent beam from the first plastic lens, which second plastic lens introduces a second significant temperature dependent spherical aberration;

wherein the magnifications of the first and second plastic lenses are chosen so that the signs of the first and second temperature dependent spherical aberrations arc opposite.

12. The system of claim 11, wherein the first and second lenses each have a respective temperature dependent spherical aberration of more than 30 mλ OPDrms for a temperature change of 30 K, while the temperature dependent spherical aberration of the system is less than 30 mλ OPDrms for a temperature change of 30 K.

* * * * *